(12) United States Patent
Hannah (10) Patent No.: US 7,517,099 B2
(45) Date of Patent: Apr. 14, 2009

(54) AUTOMOTIVE BLIND SPOT SAFETY SYSTEM AND METHOD

(76) Inventor: Arthur Andre Hannah, 2803 Riverside Pkwy., #5508, Grand Prairie, TX (US) 75050

( * ) Notice: Subject to any disclaimer, the term of this patent is extended or adjusted under 35 U.S.C. 154(b) by 92 days.

(21) Appl. No.: 10/937,955

(22) Filed: Sep. 10, 2004

(65) Prior Publication Data

US 2006/0056086 A1    Mar. 16, 2006

(51) Int. Cl.
*G02B 5/06* (2006.01)
*G02B 7/182* (2006.01)
*B60R 1/06* (2006.01)

(52) U.S. Cl. .................. 359/841; 359/843; 359/865; 359/877; 359/900; 340/463; 340/903; 362/494

(58) Field of Classification Search ............ 359/841, 359/843, 877, 900; 340/903, 458, 459, 464; 362/494
See application file for complete search history.

(56) References Cited

U.S. PATENT DOCUMENTS

| | | | | |
|---|---|---|---|---|
| 4,728,180 A | * | 3/1988 | Janowicz | 359/841 |
| 4,890,907 A | * | 1/1990 | Vu et al. | 359/843 |
| 5,007,724 A | * | 4/1991 | Hou | 359/841 |
| 5,786,772 A | * | 7/1998 | Schofield et al. | 340/903 |
| 5,796,176 A | * | 8/1998 | Kramer et al. | 307/10.1 |
| 5,798,575 A | * | 8/1998 | O'Farrell et al. | 307/10.1 |
| 6,193,380 B1 | * | 2/2001 | Jacobs | 359/843 |
| 6,204,753 B1 | * | 3/2001 | Schenk et al. | 340/435 |
| 6,916,100 B2 | * | 7/2005 | Pavao | 359/841 |
| 2005/0111117 A1 | * | 5/2005 | Qualich et al. | 359/843 |
| 2006/0050018 A1 | * | 3/2006 | Hutzel et al. | 345/60 |

FOREIGN PATENT DOCUMENTS

WO    WO 03/037681    *    5/2003

* cited by examiner

*Primary Examiner*—Ricky D Shafer
(74) *Attorney, Agent, or Firm*—Timothy M. Barlow (57) ABSTRACT

A blind spot safety system includes a side view mirror assembly. The side view mirror assembly includes a mirror housing attached to an automobile, a power supply, an adjustment motor, a mirror adjustment mechanism, and an adjustable mirror. A blind spot mirror track is incorporated into the mirror housing. The track's distal end is co-located with the blind spot mirror port. The blind spot mirror is slidingly attached inside the track. The blind spot motor and linkage assembly are attached to the mirror housing, the blind spot mirror and power supply. A signaling circuit is attached to the power supply and the blind spot motor, and it relays signals from the automobile computer, directing the blind spot mirror to extend or retract. A defroster prevents freezing and a proximity detector monitors blind spots and directs the operation of hazard indicators attached to the side view mirror assembly.

15 Claims, 5 Drawing Sheets

AUTOMOTIVE BLIND SPOT SAFETY SYSTEM AND METHOD

BACKGROUND OF THE INVENTION

1. Field of the Invention

The present invention relates generally to automotive safety systems, and more specifically to an automotive blind spot safety system and method.

2. Description of Related Art

Safe operation of a motor vehicle requires constant, proactive vigilance. The driver must be aware not only of his own automobile, but everything else around him, including road conditions and hazards, other motorists, pedestrians, animals and numerous other factors.

Typically, a driver spends the majority of his time looking forward or in the direction of his travel. However, the smart motorist knows that a large number of hazards are found to the rear or sides of the vehicle in positions known as blind spots. Blind spots are places around the vehicle that cannot be viewed in the standard, ordinary side and rear view mirrors. In order to view these areas, it is necessary for the driver to physically turn and move his head to look into those areas. Because of the physical effort involved, many drivers do not accomplish thorough checks of their blind spots before executing a turn or lane change. This is hazardous to both the driver and everyone else around him. Other problems can occur when operating the vehicle in reverse, or backing up.

Operating an automobile in reverse presents another set of problems for the driver. Virtually everything behind the vehicle, within 25 feet or so, is likely within one of the vehicle's blind spots. Often, it is more difficult to see to the rear blind spot of the vehicle than any other blind spot. Operating a vehicle in reverse is usually a low speed affair in a congested area, such as a parking lot or a garage. Many hazards are common in such areas, particularly in a home setting. For example, there may be children or other persons around who may not appreciate the hazards involved in operating a motor vehicle. They may ignore the vehicle and any warning signs of movement and may unintentionally place themselves in harm's way behind the vehicle. Thus, it is imperative that the driver have a blind spot mirror system that automatically activates to reveal as much of the vehicle's blind spots as is possible, reducing injuries and property damage. Several other solutions to this problem have been proposed and implemented, but each has its own set of shortcomings.

A blind spot mirror system requires that the driver look into the mirrors to assess the level of hazard that may be present. In some situations, such as hazard avoidance maneuvers, a quick lane change may be required without the opportunity for a detailed analysis of the side- and rear-view mirrors. A series of proximity sensors is incorporated into the vehicle to observe the vehicle's blind spots. Information from the vehicle's proximity sensors is provided to the blind spot mirror system to alert the driver of a potential or actual hazard or obstruction in a particular blind spot. The driver can quickly make a safer decision about the maneuver without a lengthy view into the mirrors.

Numerous solutions to the blind spot hazards have been proposed over the years. Many of these devices are simply convex mirrors that clip or adhere to the vehicle's side view or rearview mirror. Such devices actually act to reduce the driver's field of vision by blocking a significant portion of the original side or rearview mirrors. Other devices simply pivot the existing mirrors to view into a blind spot. In doing this action, the mirrors are unable to view into the original area.

U.S. Pat. No. 4,832,476, issued on May 23, 1989 to Mher Gabrielyan, discloses a Blind Spot Viewing Mirror System. It is simply an additional mirror assembly that attaches to the rearview mirror.

U.S. Pat. No. 6,015,215, issued on Jan. 18, 2000 to Michael Herman, discloses a Non-Obstructive, Auxiliary Rear View Mirror Assembly and Mounting Apparatus. The device is an auxiliary mirror designed to be attached to the mounting framework of the original external automotive mirror.

U.S. Pat. No. 6,193,380, issued to Raymond Jacobs on Feb. 27, 2001, discloses a Vehicle Blind Spot Mirror. The device uses sensors to detect the proximity of another vehicle in a blind spot. The device temporarily moves a side view mirror to the blind spot to reveal the vehicle to the driver while the vehicle is in the blind spot.

U.S. Pat. No. 6,363,326, issued to Robert Scully on Mar. 26, 2002, discloses a Method And Apparatus For Detecting An Object On A Side Of Or Backwards Of A Vehicle. The device uses infrared transmitters and detectors to detecting obstacles in the blind spot next to a motor vehicle. Obstacles are indicated by a display at the side view mirror.

U.S. Pat. No. 6,672,727, issued to Kurt Lohss on Jan. 6, 2004, discloses a Motorized Vehicle Mirror Actuator. The device acts to pivot the original side and rearview mirrors to view a blind spot.

U.S. Pat. No. 6,672,731, issued to Robert Schnell on Jan. 6, 2004, discloses a Vehicular Rearview Mirror With Blind Spot Viewing System. The device acts to pivot the original rearview mirror to view a blind spot.

These devices are incomplete solutions at best. Thus what is needed is a blind spot mirror system that automatically deploys to reveal the majority of a vehicle's traditional blind spots. The blind spot mirrors should be incorporated into the vehicle's side- and rear-view mirrors. The system should provide proximity sensors and hazard indicators to efficiently alert the driver of actual or potential hazardous conditions within the vehicle's blind spots.

SUMMARY OF THE INVENTION

The device is a blind spot mirror system for automotive use. The system is attached to or incorporated into a traditional side view mirror. A blind spot mirror track is incorporated into the side view mirror housing. A blind spot mirror is slidingly attached inside the blind spot mirror track. The blind spot mirror is generally coplanar with the orientation of the adjustable side view mirror. The track has a proximal end within the side view mirror housing and a distal end co-located with a blind spot mirror port on an edge of the side view mirror housing. A blind spot mirror motor and linkage assembly is attached to the interior of the side view mirror housing, the blind spot mirror and a power supply. A signaling circuit is attached to the power supply and the blind spot mirror motor. The signaling circuit relays signals from an automobile computer directing the blind spot mirror to extend or retract through the blind spot mirror port in response to predetermined automobile parameters. The blind spot mirror provides a view into the automobile's blind spot without compromising the side view mirror's view.

Accordingly, it is a principal object of the invention to provide a device for automatically deploying a blind spot mirror.

It is another object of the invention to teach a blind spot mirror system that does not interfere with the view from the side view mirror.

It is a further object of the invention to provide a blind spot mirror system that automatically defrosts its mechanism in response to a predetermined temperature parameter.

It is another object of the invention to teach a blind spot mirror system that includes a proximity sensing system to alert the driver to potential hazards in the vicinity of the vehicle.

It is a further object of the invention to provide a blind spot mirror system that alerts the driver to the level of the hazard in the vicinity of the vehicle.

It is another object of the invention to teach a blind spot mirror system that is integrated into the vehicle's antitheft system.

It is a further object of the invention to provide a blind spot mirror system that audibly and visually signals of an attempted unauthorized entry into the vehicle.

It is a further object of the invention to provide a blind spot mirror system that monitors the perimeter of the vehicle when it is parked.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE DRAWINGS

The device is a blind spot mirror system for automotive use. The device is attached to or incorporated into a traditional side view mirror to automatically provide a view of a vehicle's blind spot.

As shown in FIGS. 1-4, a side view mirror assembly 10 comprises a side view mirror housing 12 attached to an automobile, a power supply 14 routed into the side view mirror housing 12, a side view adjustment motor and adjustment mechanism 24 attached to the side view mirror housing 12, and an adjustable side view mirror 16 attached to the side view mirror motor and adjustment mechanism 24. A blind spot mirror track 18 is incorporated into the side view mirror housing 12. This blind spot mirror track 18 is generally parallel to the orientation of the adjustable side view mirror 16. The blind spot mirror track 18 is located in front of the adjustable side view mirror 16 and its adjustment mechanism to avoid interference. The side view mirror track 18 has a proximal end within the side view mirror housing 12 and a distal end co-located with a blind spot mirror port 20 on an edge of the side view mirror housing 12.

A blind spot mirror 22 is slidingly attached inside the blind spot mirror track 18 so that it can extend and retract through the blind spot mirror port 20, sliding in the blind spot mirror track 18. In the preferred embodiment, the blind spot mirror port 20 is located on the outermost edge of the side view mirror housing 12. In alternative embodiments the blind spot mirror port 20 may be located on the top or bottom edge of the side view mirror housing 12, see FIG. 3, to meet the styling or visibility needs of a particular automobile design it is applied to. In those alternative embodiments, the blind spot mirror 22 would extend from the top or bottom edge, respectively. Of course, the blind spot mirror track 18 needs to be oriented to accommodate the position of the blind spot mirror port 20.

A blind spot mirror motor and mechanism assembly 24 is attached to the interior of the side view mirror housing 12, the blind spot mirror 22 and the power supply 14. A signaling circuit 26 is attached to the power supply 14 and the blind spot mirror motor and mechanism assembly 24. In the preferred embodiment, the signaling circuit 26 relays signals from an automobile computer to direct the blind spot mirror 22 to extend or retract through the blind spot mirror port 20 in response to predetermined automobile parameters. Such parameters include velocity, transmission gear selection, temperature, and proximity to potential hazards. In the preferred embodiment, the automobile computer is an original equipment manufacturer installed unit, but the automobile computer could be an after-market or consumer-installed device to provide the required inputs for proper mirror operation, such as an axle- or driveshaft-mounted transducer to supply vehicle speed information. Unlike almost every aftermarket blind spot mirror, this blind spot mirror 22 provides a view into the automobile's blind spot without compromising the existing mirror's view.

The blind spot mirrors are extended in response to predetermined automobile parameters. A wide variety of operation profiles are possible depending on the needs and preferences of the automobile manufacturer or driver. In the preferred embodiment, the blind spot mirror 22 is extended for the duration of the predetermined automobile parameters. The blind spot mirror 22 is concealed within the side view mirror housing 12 until the predetermined automobile parameters are achieved. In the preferred embodiment, the predetermined parameters include vehicle operation in reverse gear at any speed, operation in a forward gear at speeds above 5 miles per hour, and anytime a turn signal is functioning. In another embodiment, the blind spot mirror 22 is deployed for a predetermined amount of time, such as 15 seconds, in response to the predetermined automobile parameters. The mirror 22 is retracted at the end of the predetermined time period. Other predetermined automobile parameters include throttle, brake, steering, accelerometer and GPS inputs. Throttle, brake and steering inputs may be used in combination or individually to activate the blind spot safety systems. Sudden inputs, or inputs beyond at certain rate, may indicate collision avoidance or other potentially hazardous situations. The blind spot mirrors 22 would extend to provide the driver with a more complete picture of the environment in the immediate vicinity of the automobile. GPS or accelerometer inputs may be used to provide velocity, acceleration and rate of turn inputs, and the GPS unit may also provide input based on known hazardous areas and geography. For example, a congested urban area, such as Washington, D.C. is an appropriate area for sustained deployment or extension of the blind spot mirrors 22.

In another embodiment, the automotive blind spot safety system includes a proximity sensor 28 mounted on the side view mirror housing 12. The proximity sensor 28 is also attached to the power supply 14 and the signaling circuit 26 and monitors the area around the blind spot mirror 22 for physical objects. When an object is detected, the proximity detector 28 sends a signal through the signaling circuit 26 to the power supply 14 to extend the blind spot mirror 22. Where the proximity sensor 28 is used, the blind spot safety system also includes a safety indicator array 30 attached to the side view mirror assembly 10. The safety indicator array 30 is linked to the signaling circuit 26 and the proximity sensor 28 and attached to the power supply 14. The safety indicator array 30 is a visual indicator that activates in response to proximity sensor 28 inputs. The safety indicator array 30 is activated through the proximity sensor 28 and signals the driver of potential hazards.

In one embodiment, the proximity detector 28 is capable of determining the range and bearing to a detected object and determining different hazard levels. Such a proximity detector 28 is programmed to recognize an immediate danger area and a potential hazard area. The proximity detector 28 will provide a different signal to the safety indicator array 30 based on whether the object is in the immediate danger area or the potential hazard area. For example, the immediate danger area may be designated as the space within fifteen feet to the side of the vehicle and within ten feet of the rear bumper. The potential hazard area may be designated as anything beyond the immediate danger area. The immediate danger area and the potential hazard areas may be automatically redefined in response to vehicle speed and other parameters. For example, above a certain threshold speed, such as 30 mph, the immediate danger area may be defined as anything within 50 feet of the vehicle. In the preferred embodiment, the safety indicator array 30 will illuminate a red symbol in response to an object in the immediate danger area. The safety indicator array 30 will illuminate an amber symbol in response to an object in the potential hazard area.

In another variation of the automotive blind spot safety system, the system further includes a defroster unit 32 attached inside the side view mirror assembly 10 and linked to the power supply 14 and the signaling circuit 26. The defroster unit 32 prevents the blind spot mirror 22 from becoming frozen in place or damaged due to meteorological conditions. The defroster unit 32 includes a heating element (not shown). The defrosting unit may also include a temperature sensor or a thermostatic controller, if the vehicle is not able to supply such information for proper operation of the defroster unit 32. The temperature sensor monitors the temperature inside the side view mirror housing 10. When the temperature reaches a predetermined value, such as 33 degrees Fahrenheit and below, the thermostatic controller or other automotive computer sends a signal through the signaling circuit to provide power to the heating element. In one embodiment, the heating element would operate until the temperature in the mirror housing 12 rises above a predetermined value, such as 37 degrees Fahrenheit. In another embodiment, operation of the blind spot mirror 22 is suspended until the temperature inside the side view mirror housing 12 is above a predetermined value or until the defroster has cycled at least once.

In another variation of the automotive blind spot safety system, the defroster unit 32 is linked directly to the automobile's defroster system. The blind spot mirror defroster 32 will operate any time a window defroster in the vehicle is operating.

In another embodiment, the automotive blind spot safety system is integrated into the vehicle's security and antitheft system. When the antitheft system is activated, the safety indicator 30 will illuminate. Further, the proximity detector 28 actively monitors the area around the vehicle, even when parked. Persons or objects within a predetermined distance of the vehicle will be warned of the active security system via an audible signal. Other vehicle lights, both interior and exterior, may be incorporated into the warning signal pattern. Activation of the antitheft system beyond a predetermined period can trigger a deactivation of the vehicles electrical or fuel systems. Information from the proximity detector 28 may be recorded in a memory for later review. The security system may be deactivated with the use of an authorized key. The system may also incorporate a wireless communication device for automatically contacting the vehicle owner in response to antitheft system activation.

Figure 1:
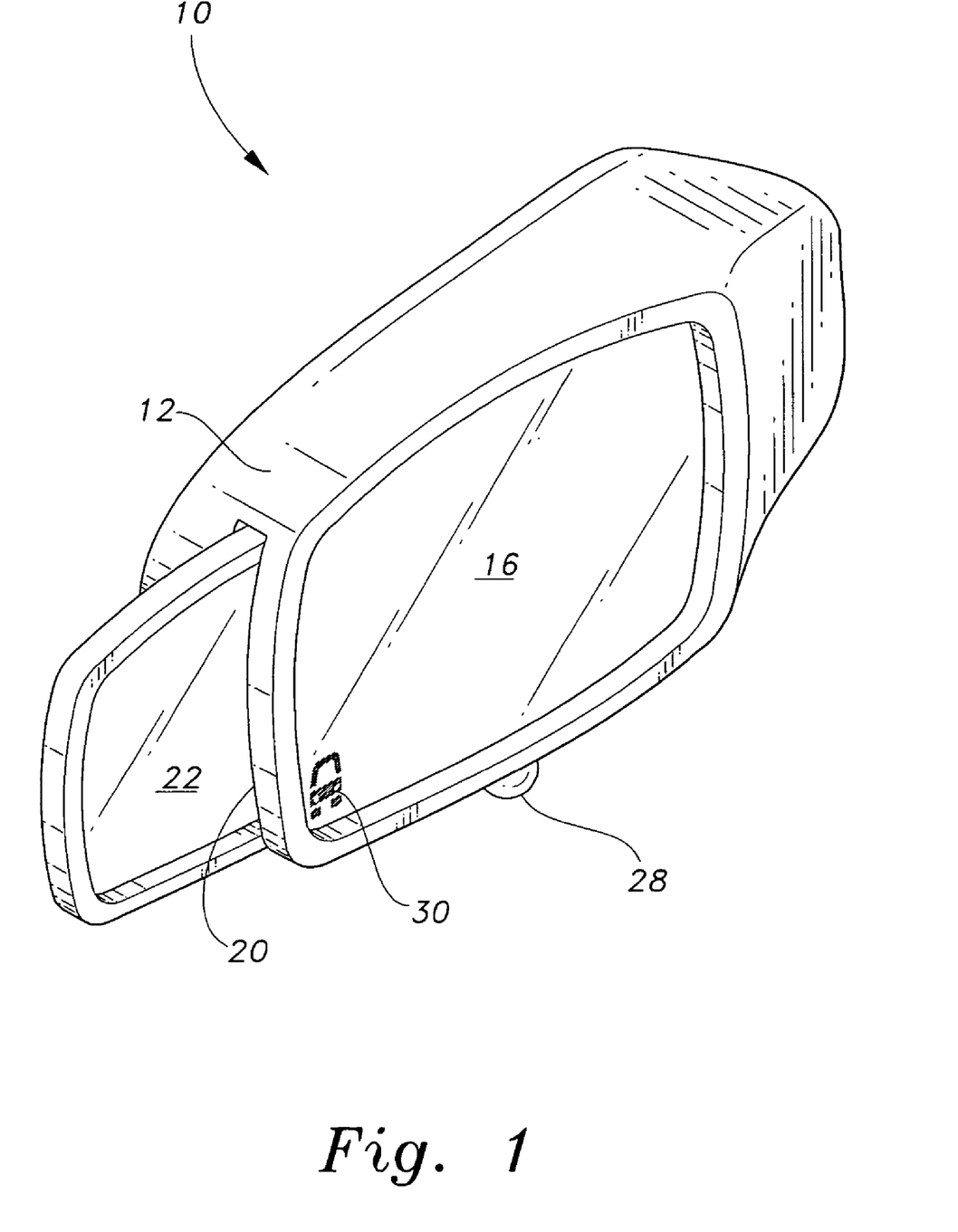
FIG. 1 is a perspective view of a deployed blind spot safety system incorporated into an automobile side view mirror, according to the present invention.
Figure 2:
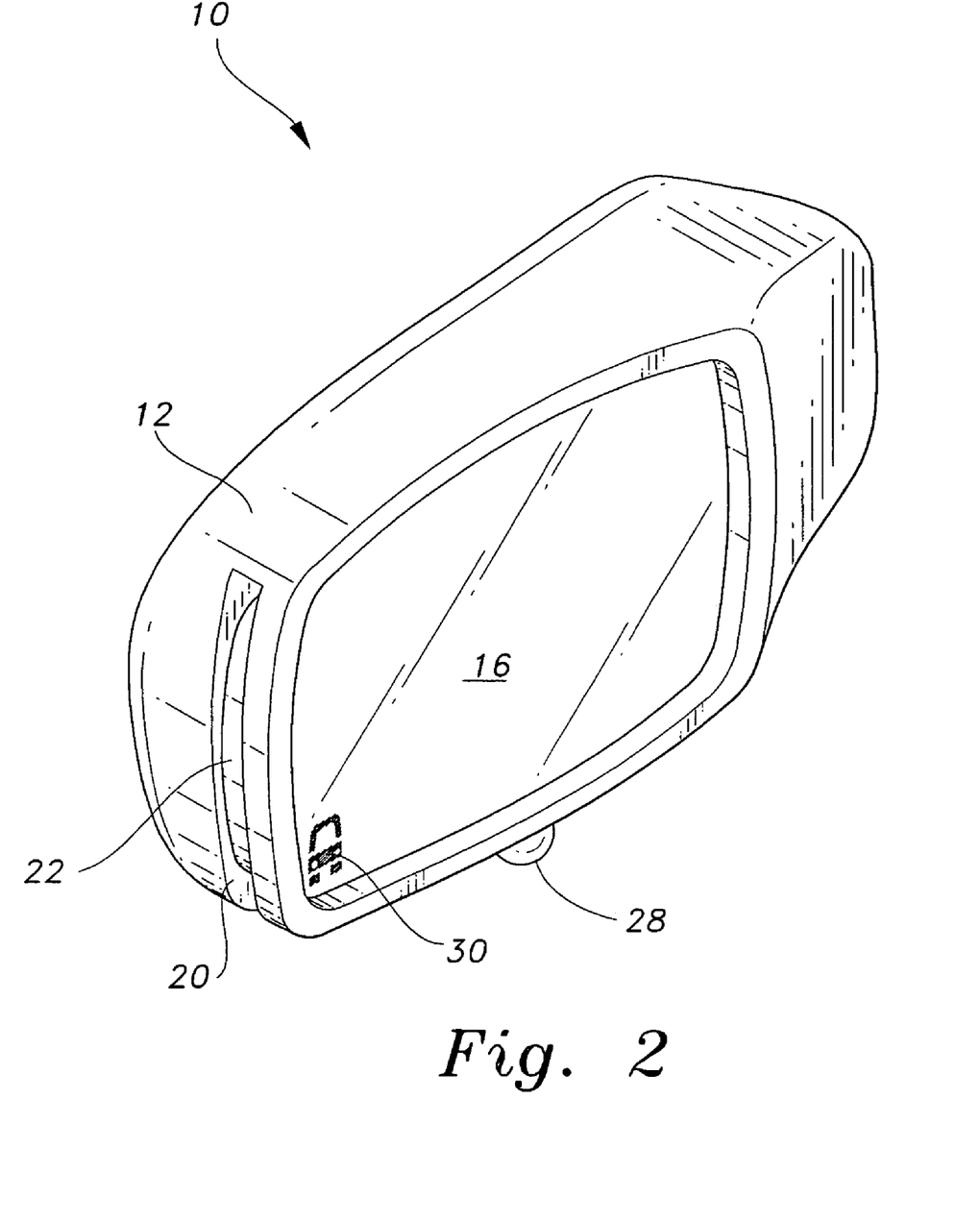
FIG. 2 is a perspective view of a retracted blind spot safety system incorporated into an automobile side view mirror, according to the present invention.
Figure 3:
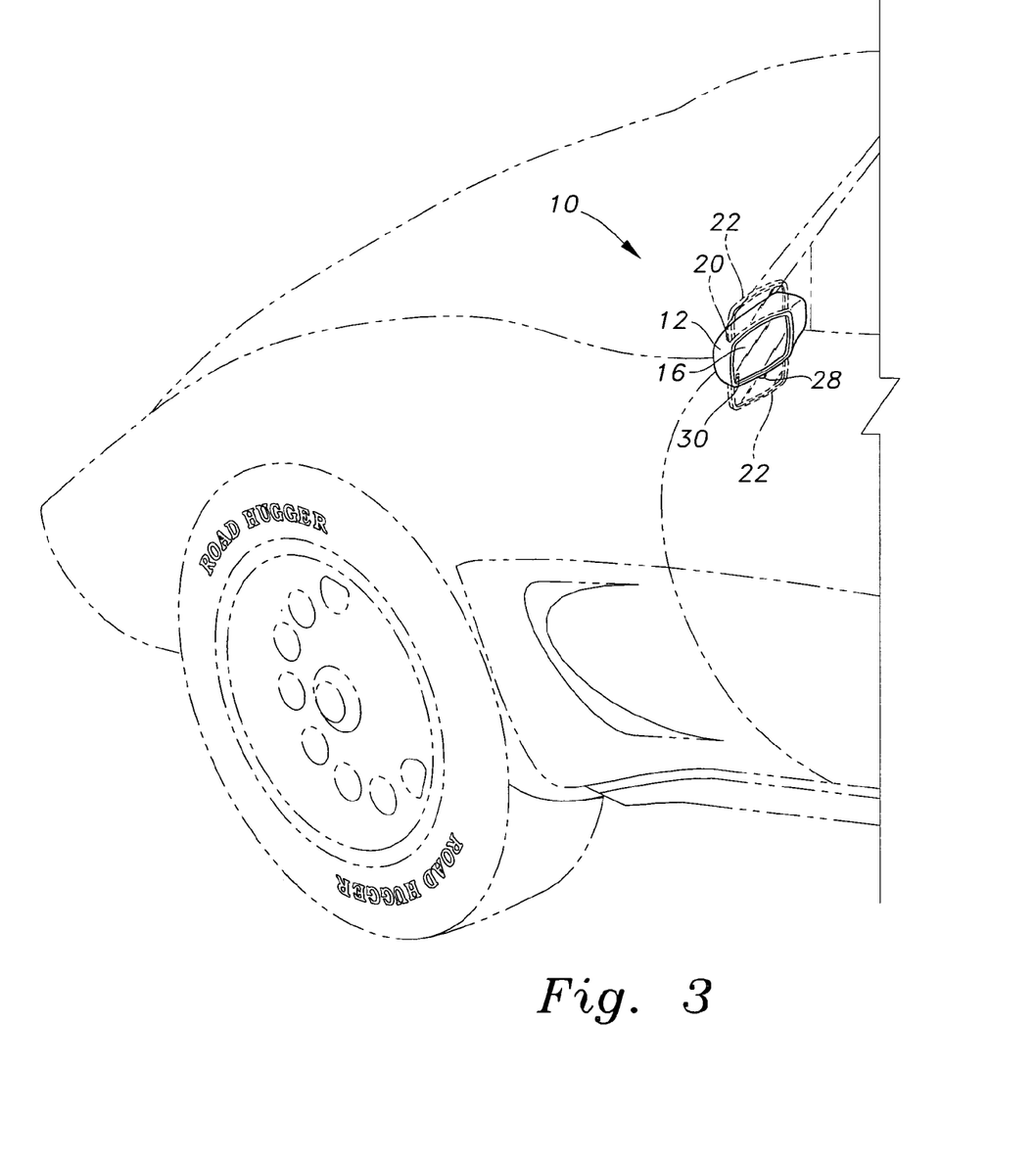
FIG. 3 is a perspective view of alternate embodiments of a deployed blind spot safety system incorporated into an automobile side view mirror according to the present invention.
Figure 4:
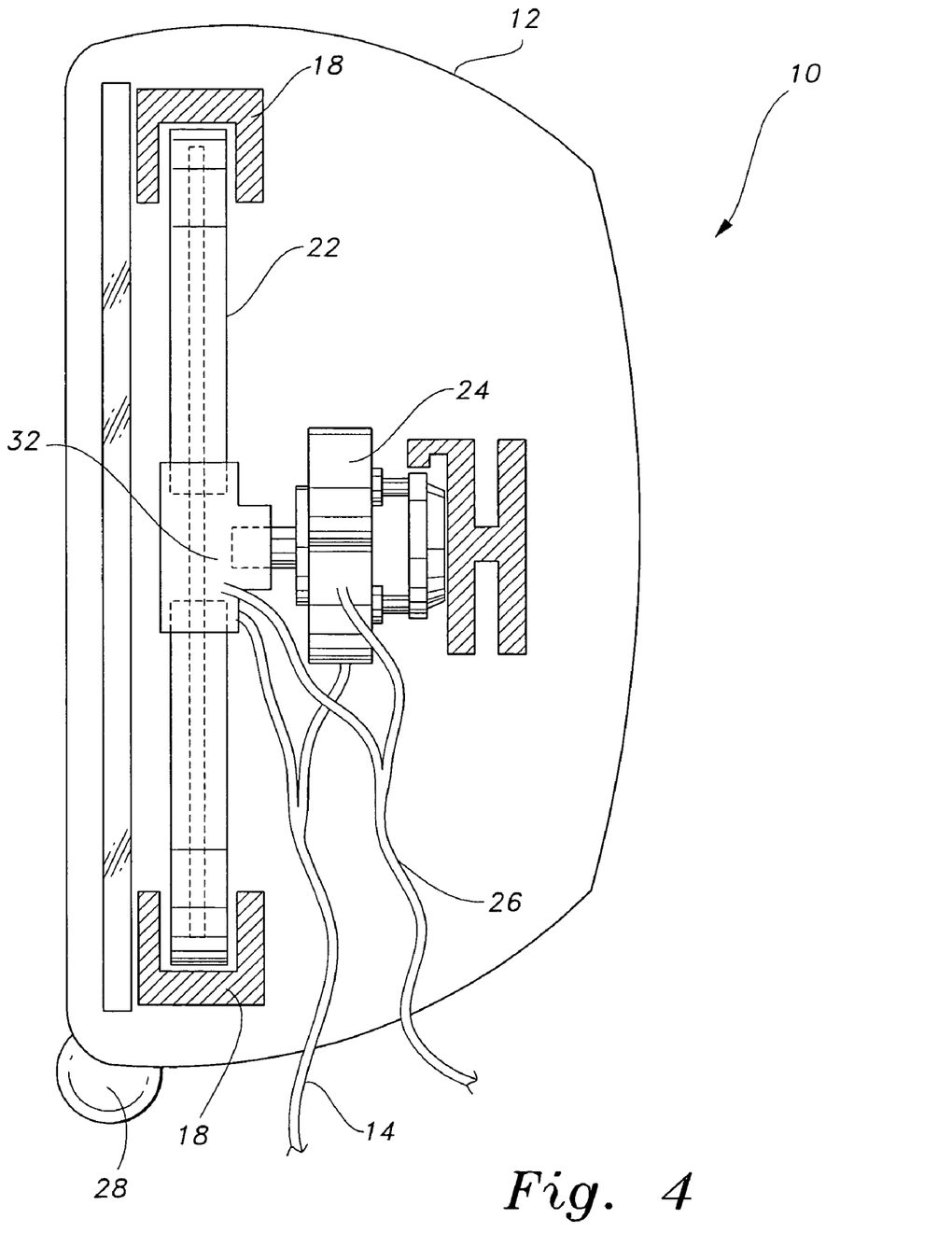
FIG. 4 is a side view of a blind spot safety system incorporated into an automobile side view mirror, according to the present invention.
Figure 5:
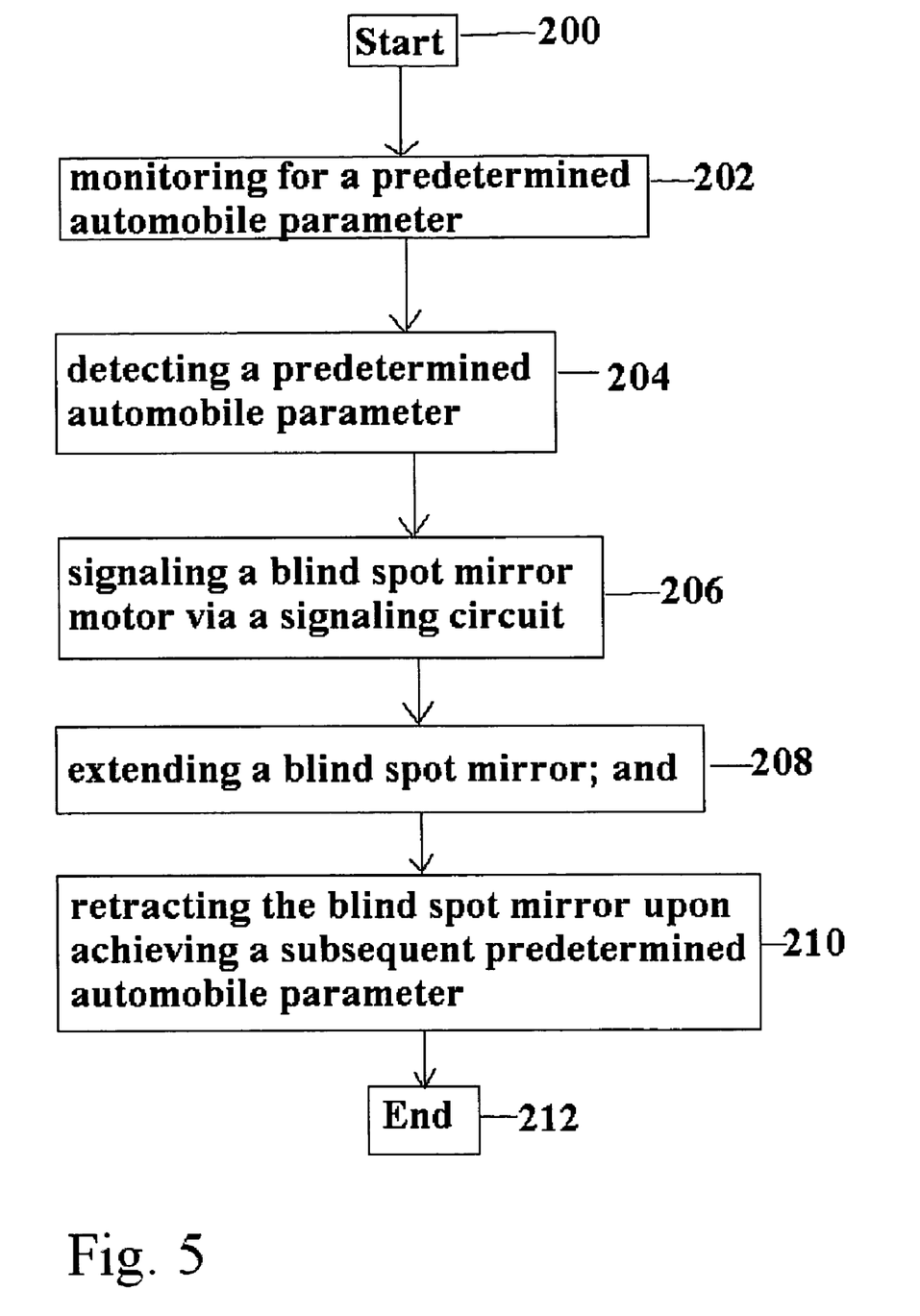
FIG. 5 is a flowchart of the steps used by a blind spot safety system incorporated into an automobile side view mirror, according to the present invention.

FIG. 5 is a flowchart of the steps used by a blind spot safety system incorporated into an automobile side view mirror. The process starts, step 200, as the system monitors for a predetermined automobile parameter, step 202. The process continues, step 204, as the system detects a predetermined automobile parameter, and signals the blind spot mirror motor via a signaling circuit, at step 206. Next, the system extends the blind spot mirror, step 208. Finally, step 210, the system retracts the blind spot mirror upon achieving a predetermined automobile parameter, which ends the process, step 212.

In one embodiment, the predetermined automobile parameter at step 202 includes automobile speed, transmission gear selected, turn signal operation, ambient temperature, rate of acceleration, rate of turn, GPS data and proximity sensor inputs. One or more in any combination may be used.

In another embodiment, when the predetermined automobile parameter comprises an automobile defroster operation signal at step 204, the system actuates a blind spot safety mirror defroster. When the automobile defroster operation signal is not detected, the system terminates the operation of the blind spot safety mirror defroster.

In another embodiment, when the predetermined automobile parameter comprises a minimum temperature threshold signal at step 204, the system suspends operation of the blind spot safety mirror motor. While the blind spot safety mirror motor is not operating, the system actuates a blind spot safety mirror defroster and heats the blind spot mirror above a predetermined minimum temperature threshold. Operation of the blind spot safety mirror is then resumed and defroster operation is terminated. When the predetermined automobile parameter at step 204 is an automobile defroster operation signal, the system actuates a blind spot safety mirror defroster. When the automobile defroster operation signal ceases, the system terminates operation of the blind spot safety mirror defroster.

When the predetermined automobile parameter at step 204 is an input from at least one proximity sensor, the system determines when the input from at least one proximity sensor indicate at least one object within the vehicle blind spot. Next, the system signals the blind spot safety indicator array via the signaling circuit and illuminates the blind spot safety indicator array. Finally, the system determines when the at least one object is not within the vehicle blind spot. When the at least one object is not within the vehicle blind spot, the system signals the blind spot safety array and extinguishes the blind spot safety indicator array. In another embodiment, the system determines at step 204 when the at least one proximity sensor detects at least one object within a predetermined distance from the vehicle. In another embodiment, the system illuminates a red indicator in the blind spot safety indicator array at step 204 when at least one object is detected within the vehicle blind spot, and illuminates an amber indicator in the blind spot safety indicator array when at least one object is detected within the predetermined distance from the vehicle. Next, the system determines when the at least one object is not within the predetermined distance from the vehicle. Finally, the system extinguishes the red indicator when no object is detected within the vehicle blind spot, and extinguishes the amber indicator when no object is detected within the predetermined distance from the vehicle.

When the system detects a predetermined automobile parameter at step 210, the system retracts the blind spot mirror into the side view mirror housing. The predetermined automobile parameters for retraction of the blind spot mirror include the cessation of the extension signal and the lapse of a predetermined amount of time.

It is to be understood that the present invention is not limited to the sole embodiments described above, but encompasses any and all embodiments within the scope of the following claims.

| Part # | Part Name |
|---|---|
| 10 | side view mirror assembly |
| 12 | side view mirror housing |
| 14 | power supply |
| 16 | adjustable side view mirror |
| 18 | blind spot mirror track |
| 20 | blind spot mirror port |
| 22 | blind spot mirror |
| 24 | blind spot mirror motor and mechanism assembly |
| 26 | signaling circuit |
| 28 | proximity sensor |
| 30 | safety indicator array |
| 32 | defroster assembly |

I claim:

1. A method of operating an automotive blind spot safety system, comprising the steps of:
   (a) monitoring for a predetermined automobile parameter, the predetermined automobile parameter including one or more of an ambient temperature from a temperature sensor, a potential hazard input from at least one proximity sensor, a first vehicle velocity and direction input, and a first vehicle computer input;
   (b) detecting the predetermined automobile parameter, including the steps of
      (b1) when the predetermined automobile parameter comprises an input from at the least one proximity sensor, detecting the input from at least one proximity sensor;
      (b2) determining when the input from at least one proximity sensor indicates at least one object within the vehicle blind spot;
      (b3) signaling a blind spot safety indicator array via a signaling circuit;
      (b4) illuminating the blind spot safety indicator array;
      (b5) determining when the at least one object is not within the vehicle blind spot;
      (b6) signaling the blind spot safety array; and
      (b7) extinguishing the blind spot safety indicator array;
   (c) signaling a blind spot mirror motor via the signaling circuit;
   (d) extending a blind spot mirror that is incorporated into a side view mirror housing, including
      a blind spot mirror track incorporated into the side view mirror housing having a side view mirror, the track and the blind spot mirror therein being generally parallel with the orientation of the side view mirror and having a proximal end within the side view mirror housing and a distal end co-located with a blind spot mirror port adjacent an edge of the side view mirror housing, the blind spot mirror slidingly attached inside the blind spot mirror track and powered by the blind spot mirror motor attached to the interior of the side view mirror housing, the blind spot mirror and a power supply; and
   (e) retracting the blind spot mirror upon achieving a second predetermined automobile parameter, the second predetermined automobile parameter including one of a predetermined minimum temperature threshold, a predetermined time period, a predetermined proximity sensor input, a second vehicle velocity and direction input, and a second vehicle computer input.

2. The method of operating an automotive blind spot safety system of claim 1, further comprising the steps of:
   (a1) monitoring the ambient temperature with a temperature sensor for a predetermined minimum temperature parameter; and
   (a2) achieving a predetermined minimum temperature parameter.

3. The method of operating an automotive blind spot safety system of claim 1, further comprising the steps of:
   (b1) when the predetermined automobile parameter comprises an automobile defroster operation signal, actuating a blind spot safety mirror defroster; and
   (b2) when the automobile defroster operation signal is not detected, terminating the operation of the blind spot safety mirror defroster.

4. The method of operating an automotive blind spot safety system of claim 1, further comprising the steps of:
   (b1) when the predetermined automobile parameter comprises a minimum temperature threshold signal, suspending operation of the blind spot safety mirror motor;
   (b2) actuating a blind spot safety mirror defroster;
   (b3) heating the blind spot mirror above a predetermined minimum temperature threshold;
   (b4) resuming blind spot safety mirror operation; and
   (b5) terminating the defroster operation.

5. The method of operating an automotive blind spot safety system of claim 4, further comprising the steps of:
   (b1) when the predetermined automobile parameter is an automobile defroster operation signal, actuating a blind spot safety mirror defroster; and
   (b2) when the automobile defroster operation signal ceases, terminating the blind spot safety mirror defroster operation.

6. The method of operating an automotive blind spot safety system of claim 1, wherein step (b2) further comprises the steps of:
   (i) determining when the at least one proximity sensor detects at least one object within a predetermined distance from the vehicle.

7. The method of operating an automotive blind spot safety system of claim 1, wherein step (b4) further comprises the steps of:
   (i) illuminating a red indicator in the blind spot safety indicator array when at least one object is detected within the vehicle blind spot; and
   (ii) illuminating an amber indicator in the blind spot safety indicator array when at least one object is detected within a predetermined distance from the vehicle.

8. The method of operating an automotive blind spot safety system of claim 1, wherein step (b5) further comprises the steps of:
   (i) determining when the at least one object is not within a predetermined distance from the vehicle.

9. The method of operating an automotive blind spot safety system of claim 1, wherein step (b7) further comprises the steps of:
- (i) extinguishing a red indicator when no object is detected within the vehicle blind spot; and
- (ii) extinguishing a amber indicator when no object is detected within a predetermined distance from the vehicle.

10. The automotive blind spot safety system of claim 1 wherein the side mirror housing is attached to the automobile, wherein the power supply is routed into the side view mirror housing, a side view adjustment motor attached inside the side view mirror housing, a side view mirror adjustment mechanism attached to the side view mirror housing and the side view adjustment mechanism, wherein the side view mirror is adjustably attached to the side view mirror adjustment mechanism;

and wherein the signaling circuit is attached to the power supply and the blind spot mirror motor, wherein the signaling circuit relays a signal from the automobile computer directing the blind spot mirror to extend or retract through the blind spot mirror port in response to at least one of the predetermined automobile parameters, the blind spot mirror providing a view into the automobile's blind spot without compromising an existing mirror's view.

11. The automotive blind spot safety system of claim 10, wherein the proximity sensor is attached to the side view mirror housing, the power supply and the signaling circuit.

12. The automotive blind spot safety system of claim 11, wherein the blind spot safety indicator array is attached to the side view mirror housing and linked to the signaling circuit and the proximity sensor and attached to the power supply.

13. The automotive blind spot safety system of claim 12, wherein the safety indicator array comprises a plurality of visual indicators wherein each of the plurality of visual indicators represents a different potential hazard level.

14. The automotive blind spot safety system of claim 10, wherein the predetermined automobile parameters comprise vehicle transmission inputs.

15. The automotive blind spot safety system of claim 1, further comprising a defroster unit attached inside the side view mirror housing and linked to the power supply and the signaling circuit, the defroster unit comprising a temperature sensor, a thermostatic controller and a heating element.

* * * * *